United States Patent [19]
Shimizu et al.

[11] Patent Number: 5,689,416
[45] Date of Patent: Nov. 18, 1997

[54] COMPUTER SYSTEM MONITORING APPARATUS

[75] Inventors: Takanori Shimizu; Chidori Yoshida; Toshihiro Morimoto, all of Kawasaki, Japan

[73] Assignee: Fujitsu Limited, Kawasaki, Japan

[21] Appl. No.: 457,476

[22] Filed: Jun. 1, 1995

[30] Foreign Application Priority Data

Jul. 11, 1994 [JP] Japan ................... 6-158863

[51] Int. Cl.[6] ................ G05B 9/02; G05B 23/02
[52] U.S. Cl. .............. 364/185; 364/184; 364/131; 364/351.01; 340/825.16; 395/200.11
[58] Field of Search ................ 364/184, 550, 364/570, 185, 176, 131, 551.01, 554; 395/575, 200.11, 587, 684; 340/825.06, 825.16

[56] References Cited

U.S. PATENT DOCUMENTS 4,941,113  7/1990  Dundies et al. ............. 364/551.01
5,432,715  7/1995  Shigematsu et al. ......... 364/551.01

*Primary Examiner*—Paul P. Gordon
*Attorney, Agent, or Firm*—Staas & Halsey

[57] ABSTRACT

A menu controller displays a menu of failure statuses on a monitor display. The menu controller displays a user select menu by referring to the contents of a user table storage, and controls the display attribute of the user select menu in accordance with the failure status. When a specific user is selected from the user select menu, the menu controller displays a system configuration menu showing the configuration layout of an associated user system by referring to the contents of an I/O table storage, and controls the display attribute of the constituting devices in accordance with the failure status. When a specific constituting device is selected from the system configuration menu, the menu controller displays a device information menu showing detailed information of the selected device, and detailed information.

6 Claims, 11 Drawing Sheets

| USER CODE | DEVICE NUMBER | STATISTICS INFORMATION, BINARY DATA, ADDED VALUE, ETC. |

FIG. 13

```
014C HISTORY MENU FOR DETAILS SENSE INFORMATION
93.06.27 17:33:30  08800030  00000043
93.06.28 09:08:08      •         •
93.06.28 20:30:31      •         •
93.06.29 21:10:15      •         •
93.06.29 21:11:12      •         •
93.06.30 03:30:30      •         •
93.06.30 03:31:20      •         •
93.06.30 03:31:50      •         •
```

FIG. 14

| USER CODE | DEVICE TYPE | CRITICALITY | DEVICE NUMBER | SENSE INFORMATION CRITICAL PORTION | SENSE INFORMATION, ETC. |
|---|---|---|---|---|---|

FIG. 15

| CRITICALITY | DISPLAY ATTRIBUTE |
|---|---|
| ⋮ | ⋮ |

COMPUTER SYSTEM MONITORING APPARATUS

BACKGROUND OF THE INVENTION

1. Field of the Invention

The present invention relates to a monitoring apparatus which is used to maintain computer systems, and, more particularly, to a computer system monitoring apparatus for efficient and intensive monitoring of the statuses of a plurality of target systems at remote places.

2. Description of the Related Art

As computer systems become larger, the number of peripheral devices constituting each system increases so that it becomes difficult to grasp the statuses of target systems for the system maintenance. As computer systems become popular, the number of clients or users per hardware maintenance engineer like a so-called customer engineer (CE) who maintains computer systems, i.e., the number of computer systems to be maintained by a single maintenance engineer becomes greater, thus increasing the burden on the individual hardware maintenance engineers.

Under this situation, to efficiently and adequately maintain computer systems, there are demands for the prevention of failures in target systems or user systems as much as possible and for the early and proper attendance when a failure occurs. For instance, it is desirable that maintenance information, such as according to the abnormal state of a peripheral device like a magnetic disk apparatus connected to a computer system or the level of a failure and information about the expending degrees of expendable supplies, should effectively be reported to ensure the proper maintenance including some preventive measures.

Conventionally, this type of maintenance of computer systems has been executed in the following manner.

(1) When a failure occurs in a user system and the user reports it, a hardware maintenance engineer goes to the user to read the contents of a system error logging file and compiles the contents to analyze the failure status. Failure information of the user system is stored as needed in the system error logging file. Based on the result of the analysis of the system error logging file, the hardware maintenance engineer performs the proper maintenance by replacing the peripheral device which has failed, for example.

(2) Each user system is generally provided with a service processor (SVP) which supports the main CPU (Central Processing Unit) of the system. The service processor can compile the system error logging file in the user system is compiled by this service processor and can transfer failure information, obtained as a result of the compiling, via a public line like a telephone line to the department or section in a maintenance company where the associated hardware maintenance engineer is posted. According to the user's request, the hardware maintenance engineer analyzes the status of the user system based on the transferred failure information, grasps the contents of the failure and then visits the user to perform the necessary maintenance.

(3) The system error logging file is written as needed by an OS (Operating System) while the user system is functioning. At the same time as this file is written, a failure information processing system which is a sub system of the OS encodes the failure information. The coded failure information is sent via a public line or the like from the service processor to a section where hardware maintenance engineers are posted (hereinafter called "HME section") or to the center which is connected on-line to a plurality of such HME sections and which controls those HME sections. The HME section or the center automatically sends the coded failure information to the HME section where the associated hardware maintenance engineer is posted. This is accomplished by causing a monitor terminal to produce an alarm by means of a buzzer or the like and display a failure information code. The service processor also sends the HME section or the center I/O (Input/Output) defining information and I/O control information of a peripheral device under the control of the service processor of the user system or under the control of the OS. The HME section or the center is equipped with a map (as a data base) for analyzing the location of the failure from the failure information code based on those information when the location of the failure is discriminated from the failure information code by referring to this map, the location of the failure is displayed together with the failure information code on the monitor terminal. When acknowledging the displayed failure information and failure location information, the hardware maintenance engineer grasps the failure status of the user system based on those information and then visits the user as needed for the maintenance job. After analyzing the failure information code and failure information location information displayed on the monitor terminal, the hardware maintenance engineer also accesses the service processor or the like of the user system from the monitor terminal whenever necessary to check the detailed failure status.

The conventional maintenance system is constructed in any of the above-described three modes or in combination of those modes according to the situation.

In accordance with an increase in the scale of computer systems, the number of peripheral devices constituting each system increases as mentioned above. In maintaining computer systems, therefore, it is important for the supporting side which maintains the system to accomplish the "early discovery of an abnormal device and early attendance" among peripheral devices of a computer system and the "grasping of the status of the system status of a peripheral device or the like at a remote site." Accomplishing this demand requires the proper reporting of peripheral-device failure information including failure information according to the level of the failure of a peripheral device like a magnetic disk apparatus connected to a computer system, preventive maintenance information and information about the expending degrees of expendable supplies.

According to the above-described conventional support system, while device configuration information and failure information upon occurrence of a critical failure are sent to the HME section where maintenance engineers are posted or the center, it is the maintenance engineers who substantially identify user names or user systems and failed devices and analyzes and diagnoses the failure situation.

In other words, the conventional maintenance system acquires the failure information and statistics information on devices simply by compiling the contents of the system error logging file, so that maintenance engineers cannot clearly identify failed devices or devices which are expected to fail unless they properly analyze the obtained information. Since adequate and detailed information of user systems are not displayed, it is not easy for a maintenance engineer who is in charge of a plurality of user systems to take action quickly when a critical failure occurs and to detect or anticipate the symptom of a failure. The maintenance engineers are mainly counted for the analysis or interpretation of failure information, which puts burden on the maintenance engineers and makes the adequately comprehension of the failure situation difficult.

SUMMARY OF THE INVENTION

Accordingly, it is an object of the present invention to provide a computer system monitoring apparatus which can properly and clearly display failure information in accordance with the failures of peripheral devices of a computer system as a monitor target and which can adequately and quickly grasp the failure situation.

A computer system monitoring apparatus according to the first aspect of this invention comprises:

- a status detecting section, provided for each target system, for detecting an occurrence of a failure and a preventive maintenance, both associated with constituting devices in the computer system, and outputting failure/maintenance information via a transmission system;
- a system display section for displaying a list of target systems;
- a selecting section for selecting a target system of interest from the target systems displayed by the system display section;
- a configuration layout display section for generating and displaying a system configuration layout of the target system selected by the selecting section;
- a first warning display section for, when informed of an occurrence of a failure satisfying a predetermined condition in a constituting device in a target system based on the failure/maintenance information, indicating an alarm by altering a display attribute of an associated target system name among names of the target systems displayed by the system display section; and
- a second warning display section for, when informed of an occurrence of a failure satisfying a predetermined condition of a target system based on the failure/maintenance information, indicating an alarm by altering a display attribute of an associated constituting device among individual constituting devices displayed by the configuration layout display section.

The monitoring apparatus according to the first aspect of this invention may further comprise a configuration information informing section for outputting configuration information about constituting devices in the computer system, via a transmission system.

A computer system monitoring apparatus according to the second aspect of this invention comprises:

- a status detecting section, provided for each target system, for detecting an occurrence of a failure and a preventive maintenance, both associated with constituting devices in the computer system, and outputting failure/maintenance information via a transmission system;
- a system display section for displaying a list of target systems;
- a first selecting section for selecting a target system of interest from the target systems displayed by the system display section;
- a configuration layout display section for generating and displaying a system configuration layout of the target system selected by the first selecting section;
- a second selecting section for selecting a constituting device of interest from the system configuration layout displayed by the configuration layout display section;
- a statistics information display section for generating and displaying statistics information of the constituting device selected by the second selecting section;
- a first warning display section for, when informed of an occurrence of a failure satisfying a predetermined condition in a constituting device in a target system based on the failure/maintenance information, indicating an alarm by altering a display attribute of an associated target system name among names of the target systems displayed by the system display section; and
- a second warning display section for, when informed of an occurrence of a failure satisfying a predetermined condition of a target system based on the failure/maintenance information, indicating an alarm by altering a display attribute of an associated constituting device among individual constituting devices displayed by the configuration layout display section.

The monitoring apparatus according to the second aspect of this invention may further comprise a configuration information informing section for outputting configuration information about constituting devices in the computer system, via a transmission system.

A computer system monitoring apparatus according to the third aspect of this invention comprises:

- a status detecting section, provided for each target system, for detecting an occurrence of a failure and a preventive maintenance, both associated with constituting devices in the computer system, and outputting failure/maintenance information via a transmission system;
- a system display section for displaying a list of target systems;
- a selecting section for selecting a target system of interest from the target systems displayed by the system display section;
- a configuration layout display section for generating and displaying a system configuration layout of the target system selected by the selecting section;
- a first warning display section for indicating an alarm by altering display attributes of names of the target systems displayed by the system display section in accordance with levels of failures in the target systems based on the failure/maintenance information; and
- a second warning display section for indicating an alarm by altering display attributes of individual constituting devices displayed by the configuration layout display section in accordance with levels of failures in the target systems based on the failure/maintenance information.

In the monitoring apparatus according to the third aspect of this invention, the first warning display section may include section for using at least one of a display color attribute, a display gradation attribute and a display mode attribute as a display attribute for warning display, the second warning display section may include section for using at least one of a display color attribute, a display gradation attribute and a display mode attribute as a display attribute for warning display, or a configuration information informing section for outputting configuration information about constituting devices in the computer system, via a transmission system may be provided for each target system.

A computer system monitoring apparatus according to the fourth aspect of this invention comprises:

- a status detecting section, provided for each target system, for detecting an occurrence of a failure and a preventive maintenance, both associated with constituting devices in the computer system, and outputting failure/maintenance information via a transmission system;
- a system display section for displaying a list of target systems;
- a first selecting section for selecting a target system of interest from the target systems displayed by the system display section;

a configuration layout display section for generating and displaying a system configuration layout of the target system selected by the first selecting section;

a second selecting section for selecting a constituting device of interest from the system configuration layout displayed by the configuration layout display section;

a statistics information display section for generating and displaying statistics information of the constituting device selected by the second selecting section;

a first warning display section for indicating an alarm by altering display attributes of names of the target systems displayed by the system display section in accordance with levels of failures in the target systems based on the failure/maintenance information; and a second warning display section for indicating an alarm by altering display attributes of individual constituting devices displayed by the configuration layout display section in accordance with levels of failures in the target systems based on the failure/maintenance information.

In the monitoring apparatus according to the fourth aspect of this invention, the first warning display section may include section for using at least one of a display color attribute, a display gradation attribute and a display mode attribute as a display attribute for warning display, the second warning display section may include section for using at least one of a display color attribute, a display gradation attribute and a display mode attribute as a display attribute for warning display, or a configuration information informing section for outputting configuration information about constituting devices in the computer system, via a transmission system may be provided for each target system.

According to the computer system monitoring apparatus embodying this invention, the occurrence of a failure and a preventive maintenance, both associated with constituting devices in the computer system, are detected for each target system, failure/maintenance information is output via the transmission system, a list of target systems is displayed, the configuration layout of a target system of interest, when selected, is generated and displayed, an alarm display is presented by altering the display attribute of a failure-occurred target system in the displayed list of the target systems and the display attribute of a failure-occurred constituting device in the displayed configuration layout in accordance with the failure occurred in the associated constituting device, based on the failure/maintenance information. Therefore, failure information is properly and clearly displayed in accordance with the failure in any peripheral device of a computer system as a monitor target, ensuring adequate and quick grasping of the failure situation.

According to the monitoring apparatus of the first aspect of this invention, when a failure satisfying a predetermined condition occurs in a constituting device in a target system, an alarm display is presented by altering the display attribute of the associated target system name among the target system names in the system list, and an alarm display is accomplished by altering the display attribute of the associated constituting device among the individual constituting devices in the system configuration layout. Therefore, failure information is properly and clearly displayed in accordance with the failure in any peripheral device of a computer system as a monitor target.

According to the monitoring apparatus of the first aspect of this invention, if configuration information about constituting devices in the target system is sent via a transmission system, remote system monitoring can be executed.

According to the monitoring apparatus of the second aspect of this invention, when a target system of interest is selected from a displayed list of target system, the system configuration layout of the selected target system is displayed, and when a constituting device of interest is selected, the statistics information of the constituting device is displayed. When a failure satisfying a predetermined condition occurs in a constituting device in a target system, an alarm display is presented by altering the display attribute of the associated target system name among the displayed target system names and by altering the display attribute of the associated constituting device among the displayed individual constituting devices. Therefore, the occurrence of a failure in the computer system to be monitored is clearly displayed and the failure situation can easily be grasped.

According to the monitoring apparatus of the second aspect of this invention, if configuration information about constituting devices in the target system is sent via a transmission system, systems can be monitored at a remote place.

According to the monitoring apparatus of the third aspect of this invention, the occurrence of a failure and a preventive maintenance, both associated with constituting devices in the target system, are detected, failure/maintenance information is output via the transmission system, a list of target systems is displayed, the system configuration layout of a target system of interest, when selected, is generated and displayed, an alarm display is presented by altering the display attributes of the displayed target system names and individual constituting devices in accordance with the level of the failure occurred in the associated constituting device, based on the failure/maintenance information. Therefore, the failure situation of the computer system to be monitored properly displayed, thus ensuring easy comprehension of the failure situation.

According to the monitoring apparatus of the third aspect of this invention, if at least one of the display color attribute, display gradation attribute and display mode attribute is used as the display attribute for warning display, the degree of the failure situation can easily comprehended. According to the monitoring apparatus of the third aspect of this invention, if configuration information about constituting devices in the target system is sent via a transmission system, systems can be monitored at a remote place.

According to the monitoring apparatus of the fourth aspect of this invention, the occurrence of a failure and a preventive maintenance, both associated with constituting devices in the target system, are detected, failure/maintenance information is output via the transmission system, a list of target systems is displayed, the system configuration layout of a target system of interest, when selected, is generated and displayed, and the statistics information of a constituting device of interest, when selected, is displayed. When a failure satisfying a predetermined condition occurs in a constituting device in the target system, an alarm display is presented by altering the display attributes of the displayed target system names and individual constituting devices. Therefore, the failure situation of the computer system to be monitored is properly displayed, thus ensuring easy estimation of the failure situation.

According to the monitoring apparatus of the fourth aspect of this invention, if at least one of the display color attribute, display gradation attribute and display mode attribute is used as the display attribute for warning display, the degree of the failure situation can easily comprehended. According to the monitoring apparatus of the fourth aspect of this invention, if configuration information about constituting devices in the target system is sent via a transmission system, remote system monitoring can be accomplished.

BRIEF DESCRIPTION OF THE DRAWINGS

Other objects and advantages of the invention will become apparent during the following discussion in conjunction with the accompanying drawings, in which:

FIG. 13 is an exemplary diagram showing one example of a detailed information menu for explaining the operation of the computer system monitoring apparatus in FIG. 1;

FIG. 14 is an exemplary diagram exemplifying the format of a failure information code for explaining the operation of the computer system monitoring apparatus in FIG. 1; and FIG. 15 is an exemplary diagram exemplifying the format of a correlation table between failure criticality and display attributes for explaining the operation of the computer system monitoring apparatus in FIG. 1.

DETAILED DESCRIPTION OF THE PREFERRED EMBODIMENTS

Specific embodiments of a computer system monitoring apparatus according to the present invention will now be described referring to the accompanying drawings.

Figure 1:
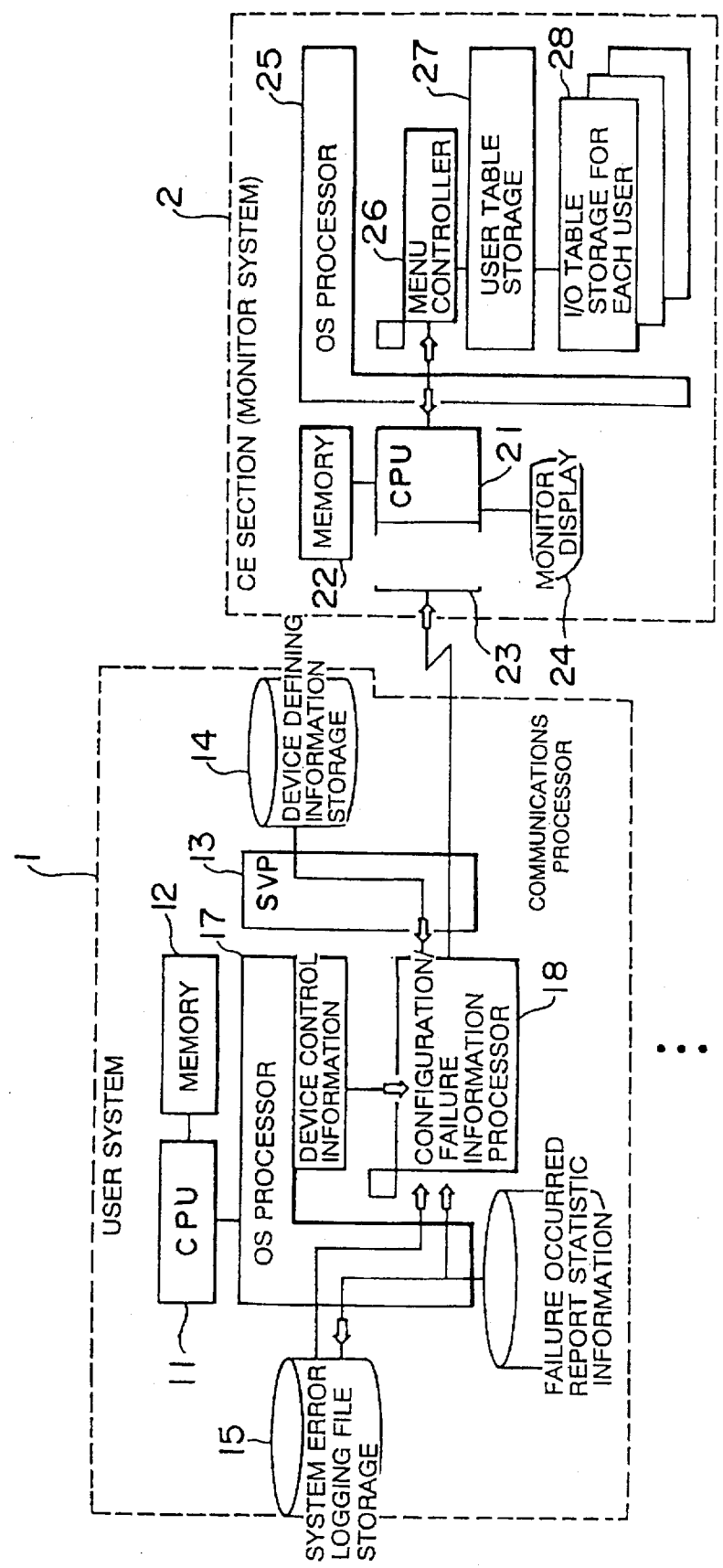
FIG. 1 is a block diagram illustrating the system structure of a computer system monitoring apparatus according to one embodiment of the present invention.

FIG. 1 shows the structure of a computer system monitoring apparatus according to one embodiment of this invention. In this embodiment, the computer system monitoring apparatus is designed for the monitoring and maintenance of a plurality of monitor target systems, e.g., user systems, and hardware maintenance engineers, e.g., customer engineers (CEs), who service the system support are posted in a predetermined section (hereinafter called "CE section"). The computer system monitoring apparatus in FIG. 1 comprises user systems 1 and a monitor system 2. One or more user systems 1, normally a plurality of user systems 1, are coupled via a transmission system to a single monitor system 2.

Each user system 1 has a CPU (Central Processing Unit) 11, a memory 12, a service processor (SVP) 13, a device defining information storage 14, a system error logging file storage 15, an OS (Operating System) processor 17, a configuration/failure information processor 18 and peripheral devices (not shown).

The CPU 11, which is the main processing unit for the user system 1, access the memory 12 and controls the processes of the OS processor 17, configuration/failure information processor 18 and peripheral devices. The memory 12 is the main storage section of the CPU 11.

The OS processor 17 is the main basic function section which holds device control information of peripheral devices constituting the user system 1 and performs the processing of the user system 1 under the control of the CPU 11. That is, the processing by the CPU 11 in the user system 1 is executed essentially via this OS processor 17. Failure information including predictive maintenance information of a failure, which may occur in a peripheral device of the user system 1, and statistics information of the history of the failure information are stored as a logging file in the system error logging file storage 15 via the OS processor 17 whenever necessary.

The service processor 13 has its own processor to manage the running status of the user system 1. Stored in the device defining information storage 14 is I/O defining information of the peripheral devices of the local user system.

The configuration/failure information processor 18 reads the device defining information of any peripheral device from the device defining information storage 14 via the service processor 13 and reads the device control information from the OS processor to acquire the device configuration information of the local user system. The configuration/failure information processor 18 also reads failure information and failure statistics information from the system error logging file storage 15 to acquire failure information. Based on the device configuration information and failure information, the configuration/failure information processor 18 sends the device configuration information via the service processor 13 to a transmission system and produces a failure information code, such as FLAG (FaiLure Analysis Guide), which is obtained by encoding a failed section and failure situation, and sends the code to the transmission system via the service processor 13. The status detecting section is constituted by this configuration/failure information processor 18.

In this case, the transmission system is a public line like a telephone line and is coupled to the monitor system 2 at the CE section. Generally, a plurality of CE sections located nationwide or for each predetermined area are coupled by a CE center (not shown) which controls and manages those CE sections. The mentioned transmission system may be coupled via this CE center to the monitor system 2 in a predetermined CE section and the monitor system 2 may be provided in the CE center.

The monitor system 2 provided in the CE center has a CPU 21, a memory 22, a communications processor 23, a monitor display 24, an OS processor 25, a menu controller 26, a user table storage 27 and an I/O table storage 28.

The CPU 21, which is the main processing unit for the monitor system 2, access the memory 22 and controls the processes of the OS processor 25 and menu controller 26.

The CPU 21 is coupled to the transmission system via the communications processor 23 using a modem or the like. The memory 22 is the main storage section of the CPU 21.

The OS processor 25 is the main basic function section which performs the processing of the monitor system 2 under the control of the CPU 21. That is, the processing by the CPU 21 in the monitor system 2 is executed essentially via this OS processor 25. The communications processor 23, coupled to the transmission system via a modem or the like, receives information via the transmission system, and this information is supplied for the direct processing by the CPU 21 or the processing by the menu controller 26 via the OS processor 25.

The menu controller 26, which is the core of the present system, causes the monitor display 24 to display the menu of the failure situation based on the device configuration information and the FLAG code as a failure information code, given from the user system 1 via the transmission system and further received via the communications processor 23 and the OS processor 25. The menu controller 26 discriminates the user code and I/O defining information from the device configuration information, produces a user name display table and device configuration layout display table and stores those tables in the user table storage 27 and the I/O table storage 28, respectively. Stored in the I/O table storage 28 is a detailed information table for displaying more detailed information about each constituting device as needed. Registered in this detailed information table are sense information for failure detection, statistics information and graph display information for displaying device information about each constituting device, and history information, such as sense information and statistics information, for displaying information at a lower level or detailed information.

The menu controller refers to the user table storage 27 to display a user select menu having a list of user names, detects a failure situation for each user from the FLAG code, and controls the user name display attribute of the user select menu. For example, when there is a critical failure, the display attribute is controlled to display the user name in red, while when the period for preventive maintenance is expected to come soon, the display attribute is controlled to display the user name in yellow. This display attribute is determined in accordance with the most critical failure among the failure situations of the peripheral devices of the local system.

Further, when a specific user is selected from the user select menu through the operation of the monitor system 2, the menu controller 26 refers to the I/O table storage 28 to display the system configuration menu showing the device configuration layout of the associated user system, detects the failure situation for each peripheral device or each constituting device from the FLAG code, and controls the display attribute of the constituting device in accordance with the failure situation. In this case too, for example, when there is a critical failure, the display attribute is controlled to display the user name in red, while when the period for preventive maintenance is expected to come soon, the display attribute is controlled to display the user name in yellow.

When a specific constituting device is selected from the system configuration menu through the operation of the monitor system 2, the menu controller 26 refers to the I/O table storage 28 to display specific sense information, statistics information and graph display information about this constituting device information by means of the device information menu showing more detailed information for the constituting device. When an item or the like is selected form the device information menu, the menu controller 26 displays the detailed information about this item from the detailed information menu. In this case too, for example, the display attribute is controlled to display in red the section corresponding to the critical failure, while the display attribute is controlled to display in yellow what corresponds to the portion whose period for preventive maintenance is expected to come soon.

As apparent from the above, the menu controller 26 displays menus in a hierarchical manner as needed. As mentioned above, the display attribute of user names in the user select menu is dependent on the display attribute corresponding to the most important one of the display attribute or the like of the constituting devices of the local system in a menu at a lower level than the system configuration menu which is located lower than the user select menu. The aforementioned display attribute includes not only the one about the display color but also a display attribute about the display mode, such as blinking display, the blinking period and highlighting display.

The operation of the computer system monitoring apparatus constituted as shown in FIG. 1 will be explained with reference to the flowcharts given in FIGS. 2 through 4.

Figure 2:
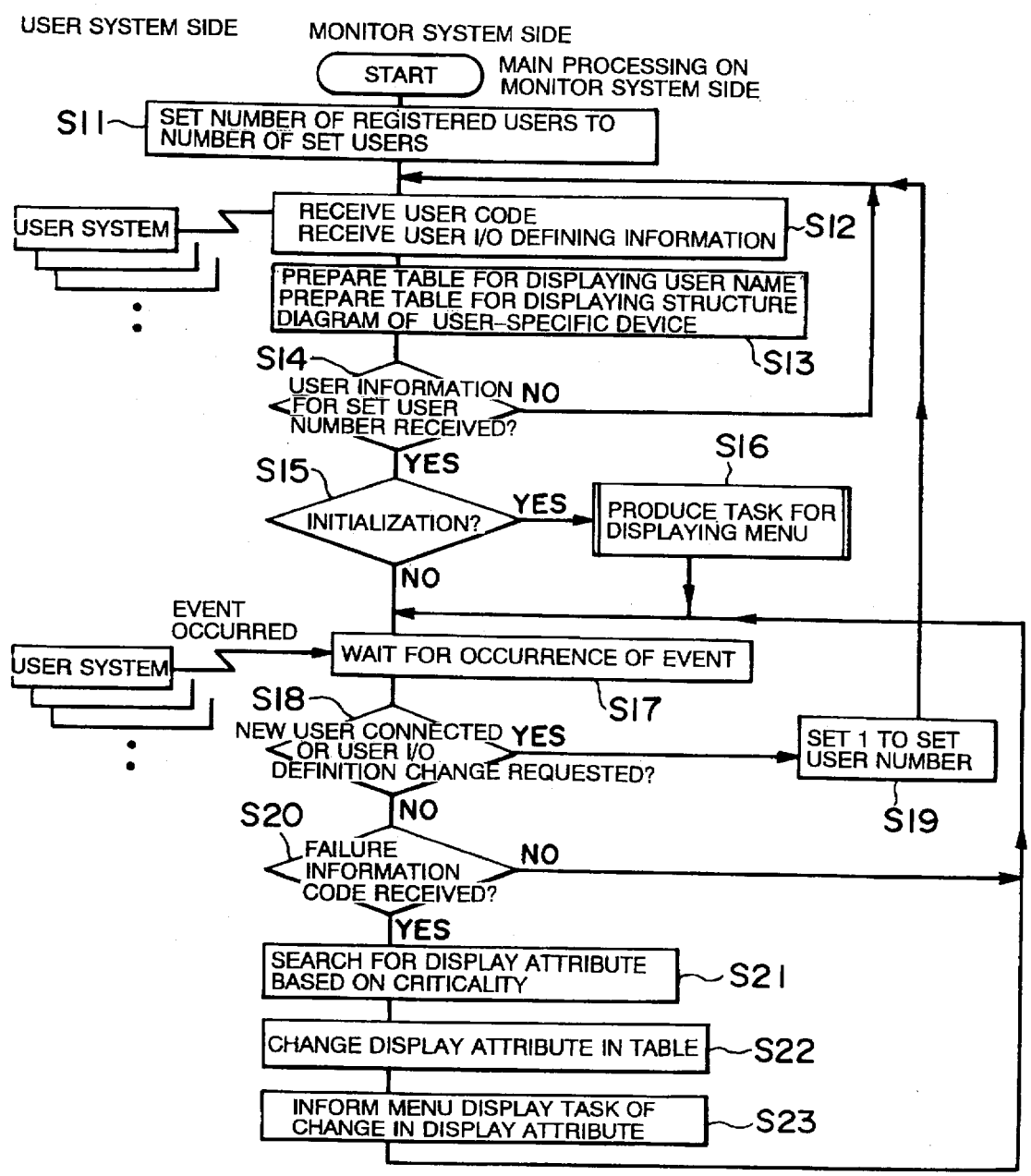
FIG. 2 is a flowchart for explaining the operation of a monitor system in the computer system monitoring apparatus in FIG. 1.

FIG. 2 shows the flowchart for the main process on the monitor system side. The processing illustrated in this flowchart is executed by the menu controller 26 mainly under the control of the CPU 21 of the monitor system 2.

When the processing starts, first, the number of users to be registered as monitor targets is set as a set user number (step S11). When the monitor system 2 reads a user code and user I/O defining information based on transmission binary data sent to the monitor system 2 from a single user system 1 (step S12), the monitor system 2 prepares the user name display table and user-specific device configuration layout display table, which are in turn stored in the user table storage 27 and user-specific I/O table storage 28, respectively (step S13).

Figures 4, 5:
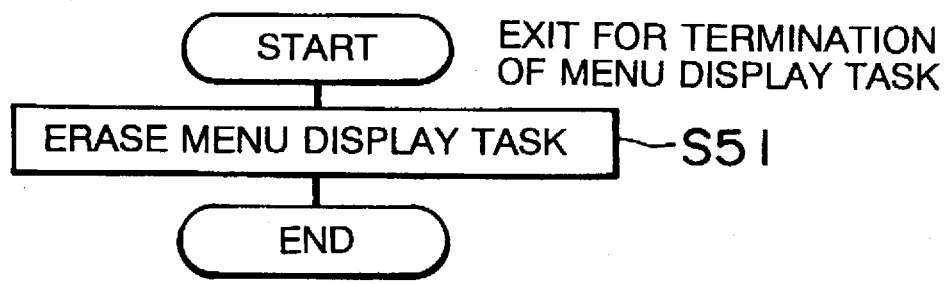
FIG. 4 is a flowchart for explaining a process of terminating the menu display task in FIG. 3 in detail.
FIG. 5 is an exemplary diagram showing one example of a transfer binary code for explaining the operation of the computer system monitoring apparatus in FIG. 1.

The format of the transmission binary data consists of a user code, device number and transfer information such as statistics information, binary data and addition value, as shown in FIG. 5. The user name display table consists of data about a user code, a user name, display coordinates, a display attribute and a pointer for the device configuration table. This table is stored in the user table storage 27. The pointer for the device configuration table is a pointer to the user-specific device configuration layout display table shown in FIG. 7, and points the associated one of the user-specific device configuration layout display tables prepared for the respective users.

Figure 7:
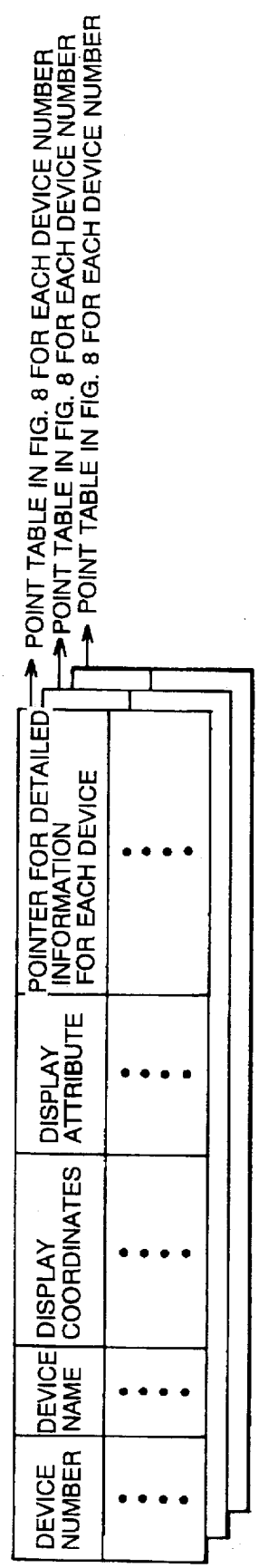
FIG. 7 is an exemplary diagram showing one example of a configuration layout display table for explaining the operation of the computer system monitoring apparatus in FIG. 1.
Figure 8:
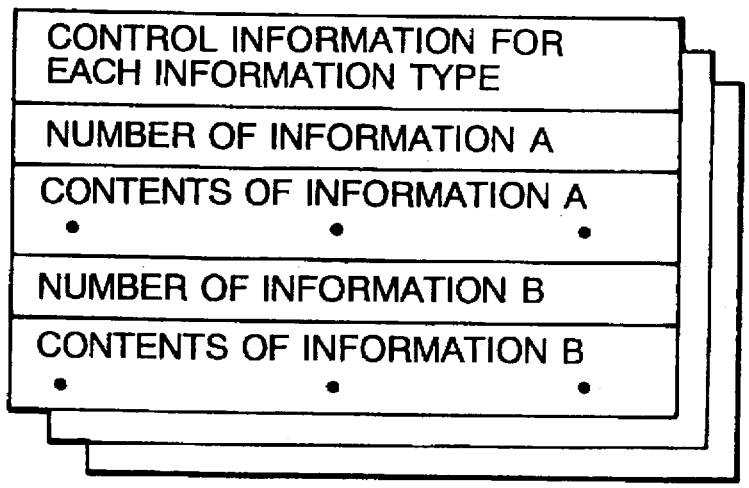
FIG. 8 is an exemplary diagram showing one example of a detailed information display table for explaining the operation of the computer system monitoring apparatus in FIG. 1.

The user-specific device configuration layout display table comprises a plurality of tables prepared for the respective users, each table consisting of data about a device number, a device name, display coordinates, a display attribute and a detailed information pointer, as shown in FIG. 7. This user-specific device configuration layout display table is stored in a part of the user-specific I/O table storage 28. The detailed information pointer is a pointer to the detailed information display table shown in FIG. 8, and points the associated one of the detailed information display tables prepared for the respective devices. The detailed information display table comprises a plurality of tables prepared for the respective devices or the respective device numbers, and each table consists of control information for each information type, and the number of pieces and contents of each information, as shown in FIG. 8. The number of pieces and contents of each are arranged in the order of, for example, the number of pieces of the first information (e.g., "information A"), the contents of the first information (information A), the number of pieces of the second information (e.g., "information B"), the contents of the second information (information B), and so forth. This detailed information display table is also stored in a part of the user-specific I/O table storage 28.

When storing those tables in the user table storage 27 and the user-specific I/O table storage 28 is accomplished for one user, it is determined whether or not user information for the set user number, set in step S11, and desired tables have been produced (step S14). When the set user number has not been reached, the flow returns to step S12 to repeat the processes in the above-described steps S12 and S13.

When it is determined in step S14 that the set user number has been reached, it is determined whether or not the initialization should be executed, i.e., whether or not a menu display has been presented (step S15). When it is the time for the initialization, a menu display task is produced and executed (step S16).

When it is not determined as the time for the initialization in step S15 and a menu display is presented in step S16, i.e., the menu display has already been executed, the monitor system 2 waits for the reception of the information about the occurrence of an event like a failure from the user system 1 (step S17). Upon reception of such information from the user system 1, it is determined if the received information is information about a request for the connection of a new user or a request to change the user I/O definition (step S18). When the received information is such request information, which requires alteration/re-preparation of a table, the set user number is set to "1" (step S19) after which the flow returns to step S12. In this case, the contents of the desired table are changed and the table is prepared again in step S13.

When it is determined in step S18 that the received information is neither information about a request for the connection of a new user or information about a request to change the user I/O definition, it is then determined whether or not the received information is a FLAG code, i.e., a failure information code (step S20). When the information is not determined as the failure information code, the flow returns to step S17 to wait for the reception of next information.

Figure 6:
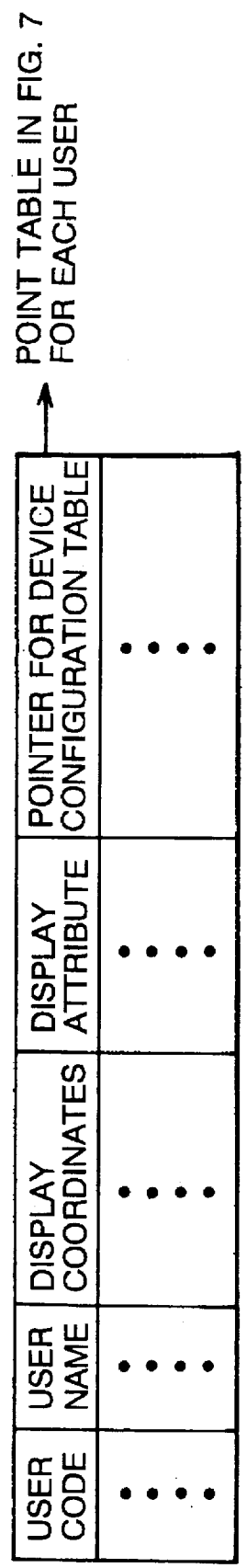
FIG. 6 is an exemplary diagram showing one example of a user name display table for explaining the operation of the computer system monitoring apparatus in FIG. 1.

When it is determined in step S20 that the failure information code has been received, failure criticality information is extracted from the failure information code and the display attribute table previously prepared is referred to obtain a desired display attribute (step S21). Based on the obtained display attribute, the contents of the display attribute corresponding to the associated device number and the user whose system has that device in the user name display table (FIG. 6) and the device configuration layout display table (FIG. 7) are changed to the desired display attribute (step S22). Further, the alteration of the display attribute is reported to the menu display task (step S23) after which the flow returns to step S17.

Figure 3:
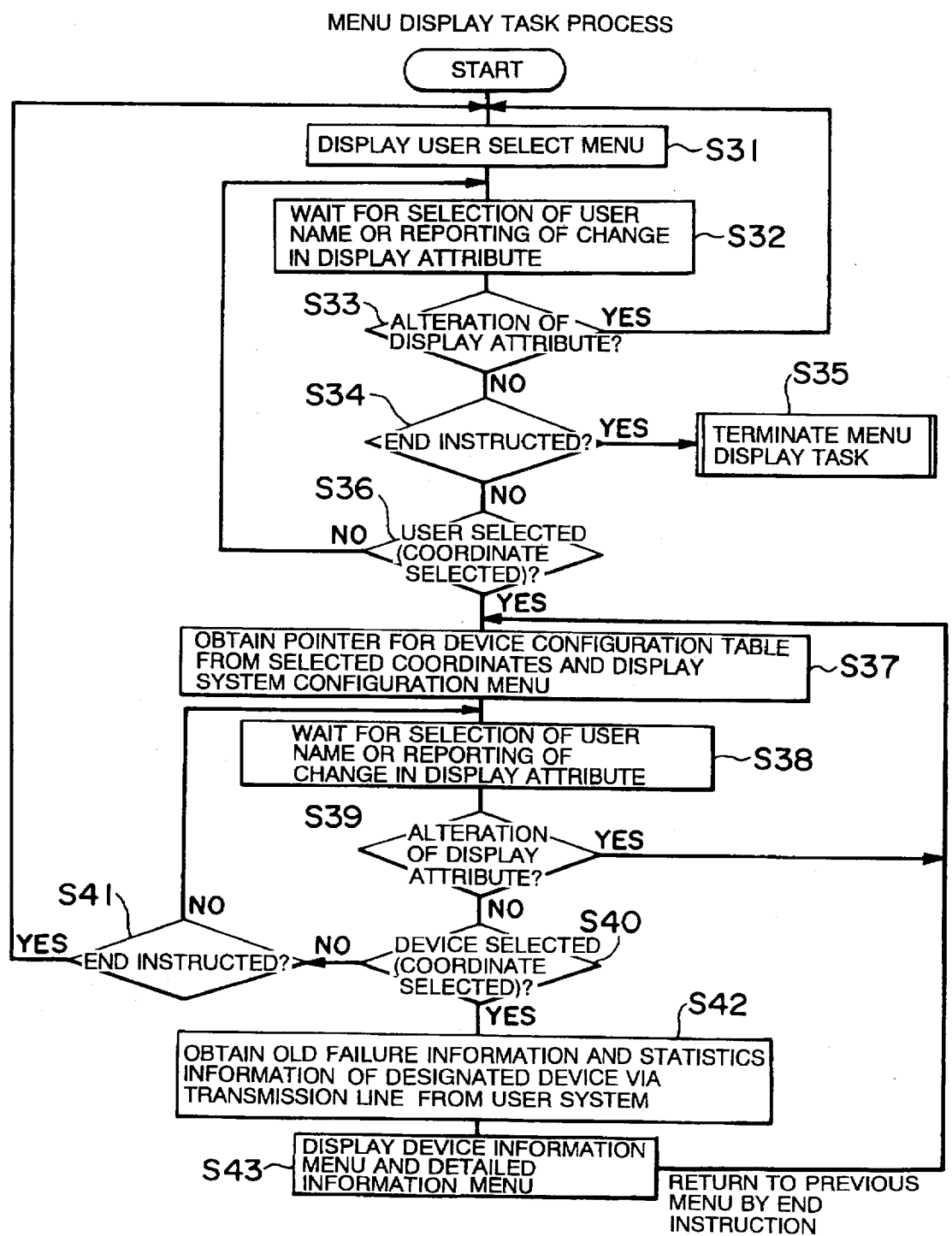
FIG. 3 is a flowchart for explaining a menu display task process in FIG. 2 in detail.
Figure 9:
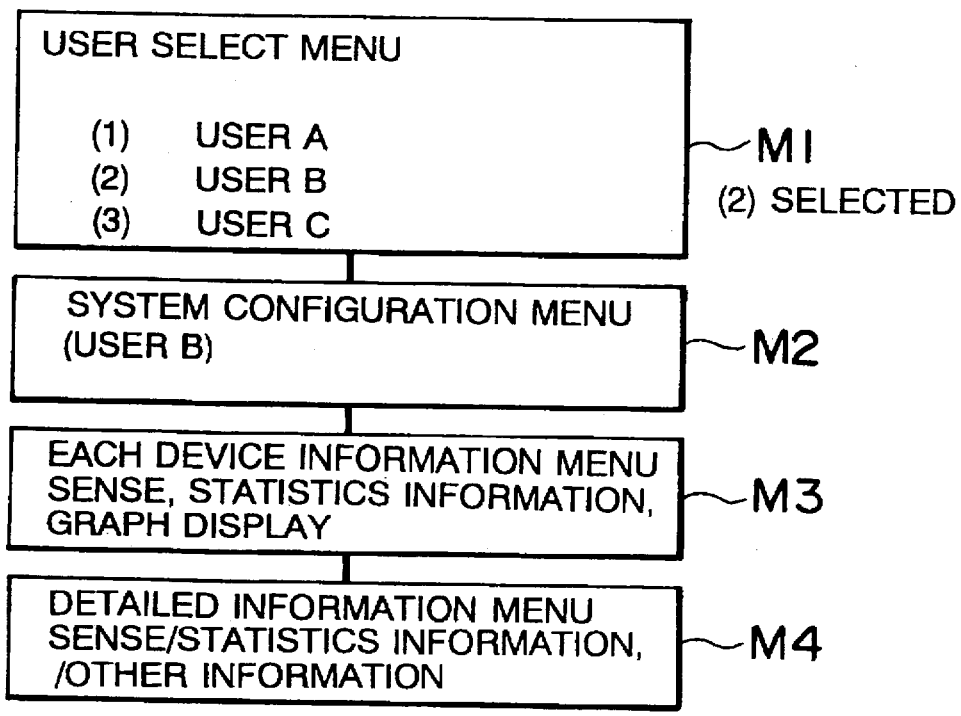
FIG. 9 is an exemplary diagram showing menu transition for explaining the operation of the computer system monitoring apparatus in FIG. 1.

The details of the menu display task process in step S16 are illustrated in FIG. 3. In this case, the transition of menu displays is carried out in a hierarchical manner as shown in FIG. 9. First, a user select menu M1 is displayed, and when a user is selected from the user select menu M1, a system configuration information menu M2 associated with that user is displayed. More specifically, when a user B is selected from the user select menu M2 which shows users A, B and C, the system configuration menu M2 for the user B is displayed. When a specific device is selected from the system configuration menu M2, a device information menu M3 consisting of sense information, statistics information, graph information and the like about that device is displayed. When a specific item is further selected from the device information menu M3, a detailed information menu M4 consisting of detailed information such as the history of the associated sense information, statistics information or the like.

FIG. 3 illustrates the details of the menu display task process.

Figure 10:
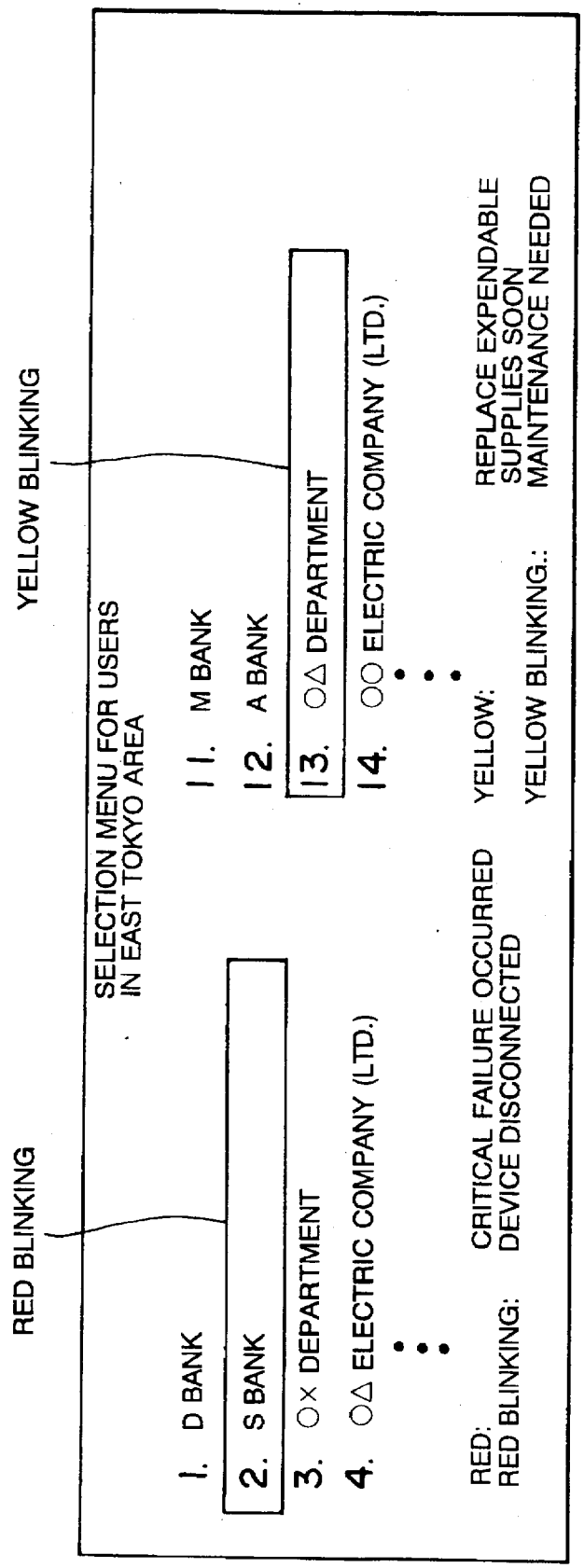
FIG. 10 is an exemplary diagram showing one example of a user select menu for explaining the operation of the computer system monitoring apparatus in FIG. 1.

When the menu display task process starts, the user select menu as exemplified in FIG. 10 is displayed based on the user name display table stored in the user table storage 27 (step S31) and the monitor system 2 waits for the selection (including the input of a termination instruction) of a specific user from among a plurality of users displayed in the user select menu by the operator's manipulation of a mouse or the like (not shown) or waits for a request to change the display attribute in step S23 in FIG. 2 (step S32).

Next, it is determined if the display attribute is to be changed (step S33). When the display attribute should be changed, the flow returns to step S31 to re-display the user select menu whose display attribute has been changed as in "2. S BANK" (blinking in red, for example) and "13. ○△ DEPARTMENT" (blinking in yellow, for example) in FIG. 10. When it is determined in step S33 that the display attribute need not be changed, it is then determined if the operator has instructed the termination (step S34). When the termination has been instructed, the termination process for the menu display task is performed to terminate this task (step S35). The termination process for the menu display task is executed by erasing the program for the menu display task from the memory 22 (step S51) as shown in FIG. 4.

In this case, the display attribute should be designed so that, for example, red indicates the occurrence of a critical failure, blinking red indicating the disconnection of a device, yellow indicates that replacement of an expendable supply is expected soon and blinking yellow indicates the need for preventive maintenance and replacement. Accordingly, the operator or maintenance engineer can comprehend the maintenance and failure situations from the display attribute.

Figure 11:
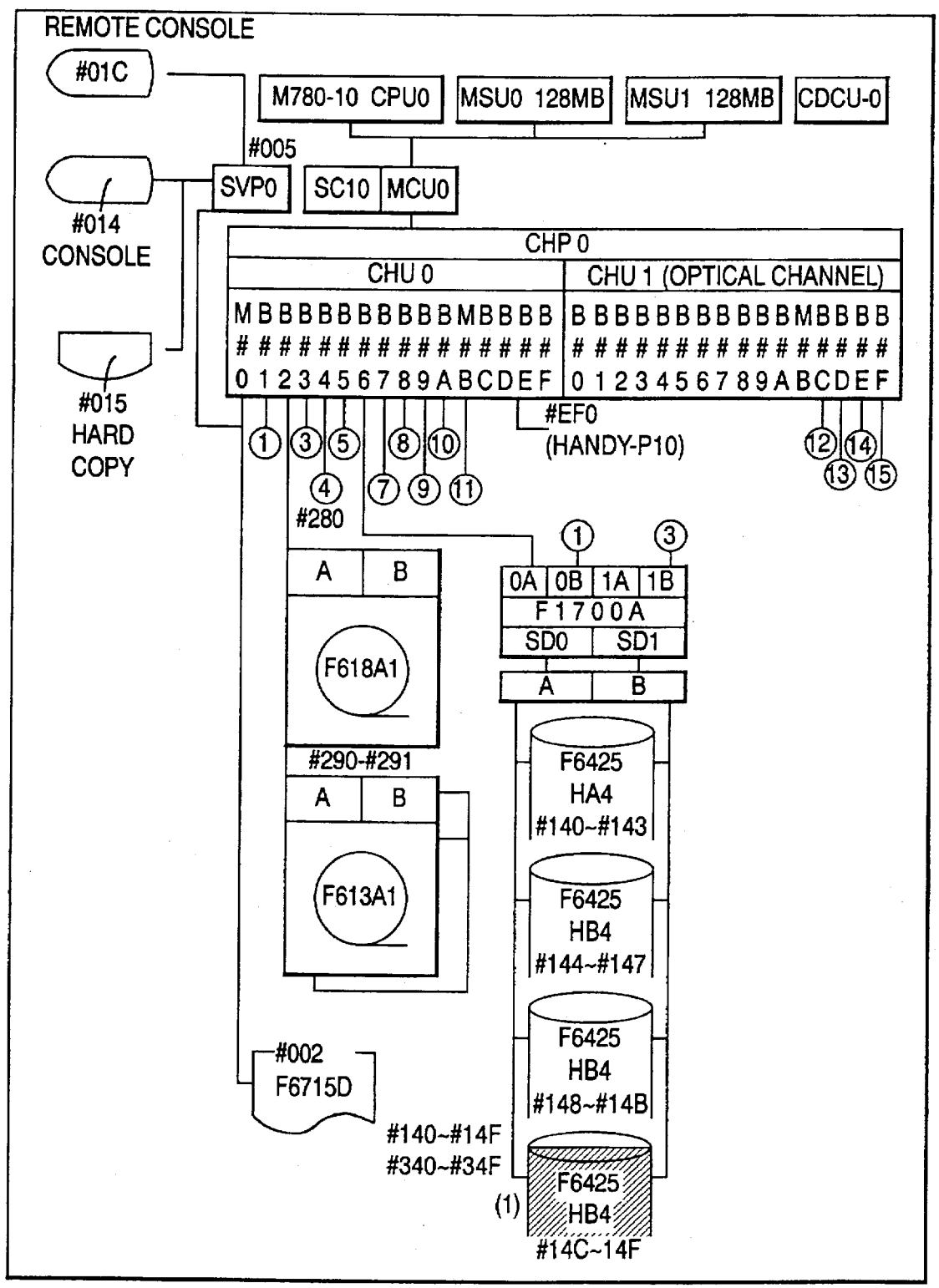
FIG. 11 is an exemplary diagram showing one example of a system configuration menu for explaining the operation of the computer system monitoring apparatus in FIG. 1.

When it is determined in step S34 in FIG. 3 that no task termination has been instructed, it is then determined whether or not a user selection has been made by the selection of coordinates on the screen (step S36). When no user selection is made, the flow returns to step S32. When it is determined in step S36 that a user selection has been made, on the other hand, the user name display table (FIG. 6) is searched for the associated configuration table pointer with respect to the selected coordinates, and the system configuration menu as shown in, for example, FIG. 11 is displayed (step S37) based on the corresponding device configuration layout display table (FIG. 7). Then, the monitor system 2 waits for the selection (including the input of a termination instruction) of a specific device from among the constituting devices displayed in the system configuration menu by the operator's operation or waits for a request to change the display attribute in step S23 in FIG. 2 (step S38).

Then, it is determined whether or not the display attribute should be changed (step S39). When the alteration of the display attribute is needed, the flow returns to step S37 to re-display the system configuration menu showing the changed display attribute of the specific device (machine numbers 14C to 14F) as shown in FIG. 11. When it is determined in step S39 that no alteration of the display attribute is needed, it is then determined whether or not a device selection has been made by the selection of coordinates on the screen (step S40). When no device selection is made, it is determined if the operator has instructed to terminate the task (step S41). When the termination is instructed, the flow returns to step S31, and when the termination is not instructed, the flow returns to step S38.

Figure 12:
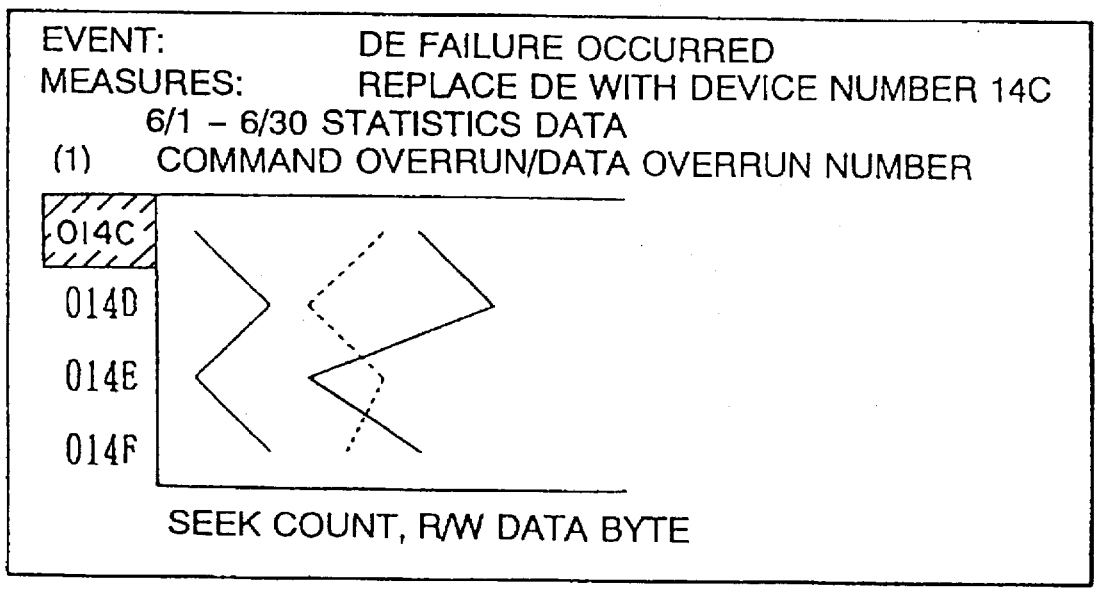
FIG. 12 is an exemplary diagram showing one example of a configuration information menu for explaining the operation of the computer system monitoring apparatus in FIG. 1.

When it is determined in step S40 that a device selection has been made, the monitor system 2 obtains old failure information and statistics information of the designated device via the transmission system from the user system 1 as needed to produce or update the detailed information display table as given in FIG. 8 (step S42) and displays device information menu as shown in FIG. 12 and further the detailed information menu as shown in FIG. 13 (step S43). When the operator instructs the task termination while the device information menu or the detailed information menu is displayed, the flow returns to step S37 to display the previous menu by one level.

When a critical failure occurs, as described above, the number of the device which has failed, the sense information and the criticality are encoded into a failure information code and this failure information code is sent together with the user code to the monitor system 2. Before the system error logging file becomes full and is cleared or at the proper period like once per week, the user system 1 adds the statistics information for each device number and sends the result as binary data to the monitor system 2. With regard to information about the replacement of expendable supplies like a printer, the latest information at the time of the transmission is sent in the form of binary data. The time for the transmission is stored in the file in such a way that already transferred information will not be sent again in the next transmission. When log information for one day is searched and the OS finds out that the number of retry successful I/O executions exceeds the allowance (threshold value) previously set for each device, the failure information code for the preventive maintenance for the associated device number is produced and is sent to the monitor system 2.

The monitor system 2 in the CE section maps the display attribute of the user code display table or the like in accordance with the criticality of the failure information code, and displays it on the monitor screen of the monitor display 24 in the form of a menu. When a user name is selected by clicking of a mouse button or the like on the menu, the table is searched based on the display coordinates, the device configuration table for the user code is searched, the display attribute is mapped on the display attribute item in the device configuration display table based on the device number and criticality in the failure information code, the device configuration layout is displayed and the associated part is indicated with the display attribute according to the criticality.

Consequently, the maintenance engineer in the CE section can adequately comprehend the status of the user system 1 without actually going over to the user. This can ensure early discovery of a failure in the user system 1, early attendance, and early detection of parts and expendable supplies which should be replaced, so that a hardware maintenance engineer needs to go over to the associated user only when the actual attendance at the user's place is needed. Further, this system is effective in reducing the work on the hardware maintenance engineers, improving the working efficiency and preventing the overmaintenance.

As valid information on peripheral devices is sent by an effective transfer method such as threshold control, the user system 1 is not be affected adversely. Since the detailed information and statistics information of peripheral devices are counted and sent to the monitor system without being overlapped, they can easily be graphed by means of a personal computer at the center or in the CE section, allowing the hardware maintenance engineers to grasp the tendency of intermittent failures and the frequency of use of expendable supplies at a glance. Further, any hardware maintenance engineer can find out the name of a user whose system has failed and the number of a user whose system needs preventive maintenance while being present in the CE section. Since a device which needs preventive maintenance is detected immediately, it is possible to reduce the time and efforts for the maintenance.

According to this computer system monitoring apparatus, the occurrence of a failure and a preventive maintenance, both associated with constituting devices in the computer system, are detected for each target system, failure/maintenance information is output via the transmission system, a list of target systems is displayed, the configuration layout of a target system of interest, when selected, is generated and displayed, an alarm display is presented by altering the display attribute of a failure-occurred target system in the displayed list of the target systems and the display attribute of a failure-occurred constituting device in the displayed configuration layout in accordance with the failure occurred in the associated constituting device, based on the failure/maintenance information. Therefore, this monitoring apparatus can properly and clearly display failure information in accordance with the failure in any peripheral device of a computer system as a monitor target. The use of this monitoring apparatus can allow a maintenance engineer to adequately and quickly grasp the failure situation.

According to another embodiment of this invention, there is provided an element which issues an alarm by altering the display attribute only when the degree of a failure exceeds a set condition, instead of changing the display attribute in accordance with the degree of a failure.

According to a further embodiment of this invention, there is provided an element which generates an alarm like a buzzer sound at the same time as the display attribute is changed.

According to a still further embodiment of this invention, a so-called pager or beeper may be used to inform a maintenance engineer of the occurrence of a critical failure when this maintenance engineer is out of the CE section.

It is apparent that, in this invention, a wide range of different working modes can be formed based on the invention without deviating from the spirit and scope of the invention.

What is claimed is:

1. A computer system monitoring apparatus comprising:
   status detecting means, provided for each of a plurality of target systems, for detecting an occurrence of a failure and a preventive maintenance, both associated with constituting devices in said computer system, and outputting failure/maintenance information via a transmission system;
   system display means for displaying a list of said target systems;
   first selecting means for selecting one of said target systems of interest from said target systems displayed by said system display means;
   configuration layout display means for generating and displaying a system configuration layout of said one target system selected by said first selecting means;

second selecting means for selecting a constituting device of interest from said system configuration layout displayed by said configuration layout display means;

statistics information display means for generating and displaying statistics information of a history of failure information of said constituting device selected by said second selecting means;

first warning display means for, when informed of an occurrence of a failure satisfying a predetermined condition in a constituting device in a target system based on said failure/maintenance information, indicating an alarm by altering a display attribute of an associated target system name among names of said target systems displayed by said system display means; and second warning display means for, when informed of an occurrence of a failure satisfying a predetermined condition of a target system based on said failure/maintenance information, indicating an alarm by altering a display attribute of an associated constituting device among individual constituting devices displayed by said configuration layout display means.

2. The monitoring apparatus according to claim 1, further comprising configuration information informing means, provided for each of said target systems, for outputting configuration information about constituting devices in said computer system, via a transmission system.

3. A computer system monitoring apparatus comprising:

status detecting means, provided for each of a plurality of target systems, for detecting an occurrence of a failure and a preventive maintenance, both associated with constituting devices in said computer system, and outputting failure/maintenance information via a transmission system;

system display means for displaying a list of said target systems;

first selecting means for selecting one of said target systems of interest from said target systems displayed by said system display means;

configuration layout display means for generating and displaying a system configuration layout of said target system selected by said first selecting means;

second selecting means for selecting a constituting device of interest from said system configuration layout displayed by said configuration layout display means;

statistics information display means for generating and displaying statistics information of a history of failure information of said constituting device selected by said second selecting means;

first warning display means for indicating an alarm by altering display attributes of names of said target system displayed by said system display means in accordance with levels of failures in said target systems based on said failure/maintenance information; and second warning display means for indicating an alarm by altering display attributes of individual constituting devices displayed by said configuration layout display means in accordance with levels of failures in said target systems based on said failure/maintenance information.

4. The monitoring apparatus according to claim 3, wherein said first warning display means includes means for using at least one of a display color attribute, a display gradation attribute and a display mode attribute as a display attribute for warning display.

5. The monitoring apparatus according to claim 3, wherein said second warning display means includes means for using at least one of a display color attribute, a display gradation attribute and a display mode attribute as a display attribute for warning display.

6. The monitoring apparatus according to claim 3, further comprising configuration information informing means, provided for each of said target systems, for outputting configuration information about constituting devices in said computer system, via a transmission system.

* * * * *